(12) United States Patent
Fällman et al.

(10) Patent No.: US 12,514,966 B2
(45) Date of Patent: Jan. 6, 2026

(54) DIALYSIS SYSTEM HAVING FILTER TESTING

(71) Applicants: Baxter Healthcare SA, Glattpark (CH); Baxter International Inc., Deerfield, IL (US)

(72) Inventors: Oskar Fällman, Lund (SE); Mauro Suffritti, Modena (IT); Björn Ericson, Lund (SE); Mauro Gusella, Modena (IT); Michael Patrick Morrissey, Algonquin, IL (US)

(73) Assignees: Baxter International Inc., Deerfield, IL (US); Baxter Healthcare SA, Glattpark (CH)

( * ) Notice: Subject to any disclaimer, the term of this patent is extended or adjusted under 35 U.S.C. 154(b) by 378 days.

(21) Appl. No.: 18/215,448

(22) Filed: Jun. 28, 2023

(65) Prior Publication Data
US 2024/0024548 A1    Jan. 25, 2024

(30) Foreign Application Priority Data
Jun. 29, 2022 (IT) .................. 102022000013750

(51) Int. Cl.
*A61M 1/28* (2006.01)
*A61M 1/16* (2006.01)

(52) U.S. Cl.
CPC .......... *A61M 1/285* (2013.01); *A61M 1/1672* (2014.02); *A61M 1/28* (2013.01);
(Continued)

(58) Field of Classification Search
CPC ...... A61M 1/1672; A61M 1/28; A61M 1/285; A61M 1/288; A61M 2205/15;
(Continued)

(56) References Cited

U.S. PATENT DOCUMENTS

| | | |
|---|---|---|
| 5,275,724 A | 1/1994 | Bucchianeri et al. |
| 2020/0086028 A1 | 3/2020 | Norman et al. |
| 2021/0220539 A1 | 7/2021 | Wellings et al. |

FOREIGN PATENT DOCUMENTS

WO  2010/002830 A2  1/2010

OTHER PUBLICATIONS

Italian Search Report from corresponding Italian Patent Application No. 102022000013750, mailed Jan. 18, 2023, 18 pages. (Partial English document).

*Primary Examiner* — John Kim
(74) *Attorney, Agent, or Firm* — K&L Gates LLP

(57) ABSTRACT

A peritoneal dialysis ("PD") system includes a housing; a PD fluid pump housed by the housing; a filter set including a filter housing and a hydrophilic filter membrane dividing an upstream chamber from a downstream chamber; a dual lumen patient line including a fresh PD fluid lumen in fluid communication with the upstream chamber and a used PD fluid lumen in fluid communication with the downstream chamber; a pressure sensor positioned and arranged to provide a pressure sensor output indicative of pressure in the downstream chamber of the filter housing; and a control unit configured to perform a pressure integrity test on the hydrophilic filter membrane by monitoring the pressure sensor output over a period of time, the pressure sensor output indicative of a negative pressure created in the downstream chamber by the PD fluid pump. A pressure drop test for evaluating the filter membrane is also disclosed.

21 Claims, 7 Drawing Sheets

(52) U.S. Cl.
CPC ......... *A61M 1/288* (2014.02); *A61M 2205/15* (2013.01); *A61M 2205/3331* (2013.01); *A61M 2205/70* (2013.01); *A61M 2205/702* (2013.01); *A61M 2205/705* (2013.01); *A61M 2205/707* (2013.01); *A61M 2205/75* (2013.01); *A61M 2210/1017* (2013.01)

(58) Field of Classification Search
CPC ...... A61M 2205/3331; A61M 2205/70; A61M 2205/702; A61M 2205/705; A61M 2205/707; A61M 2205/75; A61M 2210/1017
See application file for complete search history.

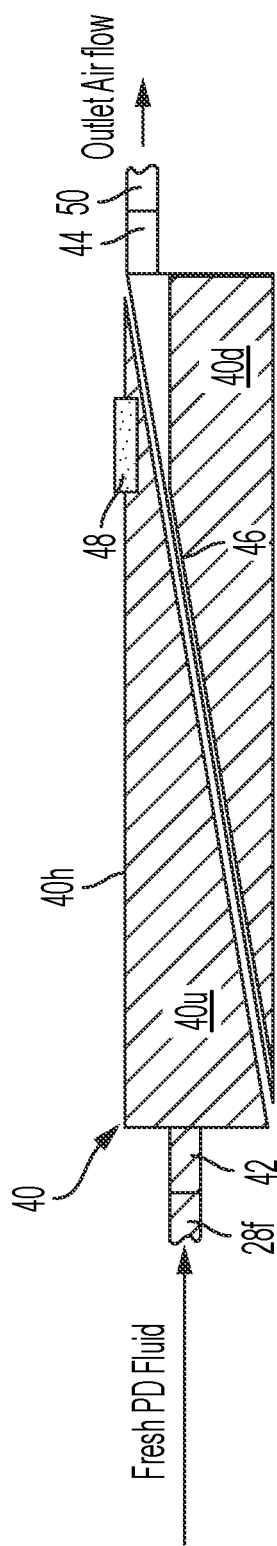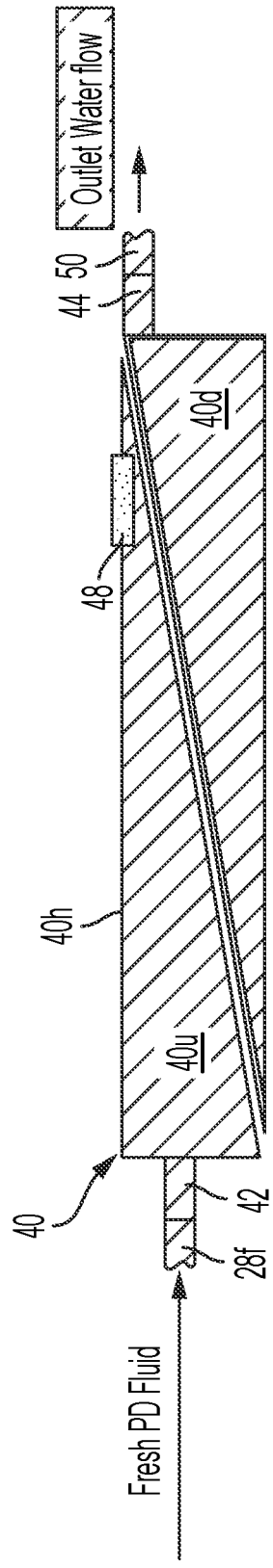

DIALYSIS SYSTEM HAVING FILTER TESTING

PRIORITY CLAIM

This application claims priority to Italian Patent Application No. 102022000013750, filed on Jun. 29, 2022, the entire disclosure of which is incorporated herein by reference.

BACKGROUND

The present disclosure relates generally to medical fluid treatments and in particular to dialysis fluid treatments that require fluid heating.

Due to various causes, a person's renal system can fail. Renal failure produces several physiological derangements. It is no longer possible to balance water and minerals or to excrete daily metabolic load. Toxic end products of metabolism, such as, urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment. The substitution fluid and the fluid accumulated by the patient in between treatments is ultrafiltered over the course of the HF treatment, providing a convective transport mechanism that is particularly beneficial in removing middle and large molecules.

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Most HD, HF, and HDF treatments occur in centers. A trend towards home hemodialysis ("HHD") exists today in part because HHD can be performed daily, offering therapeutic benefits over in-center hemodialysis treatments, which occur typically bi- or tri-weekly. Studies have shown that more frequent treatments remove more toxins and waste products and render less interdialytic fluid overload than a patient receiving less frequent but perhaps longer treatments. A patient receiving more frequent treatments does not experience as much of a down cycle (swings in fluids and toxins) as does an in-center patient, who has built-up two or three days' worth of toxins prior to a treatment. In certain areas, the closest dialysis center can be many miles from the patient's home, causing door-to-door treatment time to consume a large portion of the day. Treatments in centers close to the patient's home may also consume a large portion of the patient's day. HHD can take place overnight or during the day while the patient relaxes, works or is otherwise productive.

Another type of kidney failure therapy is peritoneal dialysis ("PD"), which infuses a dialysis solution, also called dialysis fluid, into a patient's peritoneal chamber via a catheter. The dialysis fluid is in contact with the peritoneal membrane in the patient's peritoneal chamber. Waste, toxins and excess water pass from the patient's bloodstream, through the capillaries in the peritoneal membrane, and into the dialysis fluid due to diffusion and osmosis, i.e., an osmotic gradient occurs across the membrane. An osmotic agent in the PD dialysis fluid provides the osmotic gradient. Used or spent dialysis fluid is drained from the patient, removing waste, toxins and excess water from the patient. This cycle is repeated, e.g., multiple times.

There are various types of peritoneal dialysis therapies, including continuous ambulatory peritoneal dialysis ("CAPD"), automated peritoneal dialysis ("APD"), tidal flow dialysis and continuous flow peritoneal dialysis ("CFPD"). CAPD is a manual dialysis treatment. Here, the patient manually connects an implanted catheter to a drain to allow used or spent dialysis fluid to drain from the peritoneal chamber. The patient then switches fluid communication so that the patient catheter communicates with a bag of fresh dialysis fluid to infuse the fresh dialysis fluid through the catheter and into the patient. The patient disconnects the catheter from the fresh dialysis fluid bag and allows the dialysis fluid to dwell within the peritoneal chamber, wherein the transfer of waste, toxins and excess water takes place. After a dwell period, the patient repeats the manual dialysis procedure, for example, four times per day. Manual peritoneal dialysis requires a significant amount of time and effort from the patient, leaving ample room for improvement.

Automated peritoneal dialysis ("APD") is similar to CAPD in that the dialysis treatment includes drain, fill and dwell cycles. Automated PD machines, however, perform the cycles automatically, typically while the patient sleeps. The PD machines free patients from having to manually perform the treatment cycles and from having to transport supplies during the day. The PD machines connect fluidly to an implanted catheter, to a source or bag of fresh dialysis fluid and to a fluid drain. The PD machines pump fresh dialysis fluid from a dialysis fluid source, through the catheter and into the patient's peritoneal chamber. The PD machines also allow for the dialysis fluid to dwell within the chamber and for the transfer of waste, toxins and excess water to take place. The source may include multiple liters of dialysis fluid including several solution bags.

The PD machines pump used or spent dialysate from the patient's peritoneal cavity, though the catheter, to drain. As with the manual process, several drain, fill and dwell cycles occur during dialysis. A "last fill" may occur at the end of an APD treatment. The last fill fluid may remain in the peritoneal chamber of the patient until the start of the next treatment, or may be manually emptied at some point during the day.

In any of the above modalities, the automated machine and even manual CAPD operate typically with a disposable set, which is discarded after a single use. Depending on the complexity of the disposable set, the cost of using one set per day may become significant. Also, daily disposables require space for storage, which can become a nuisance for home owners and businesses. Moreover, daily disposable replacement requires daily setup time and effort by the patient or caregiver at home or at a clinic.

For each of the above reasons, it is desirable to provide an APD machine that reduces disposable waste.

SUMMARY

The present disclosure sets forth an automated peritoneal dialysis ("PD") system, which includes a PD machine or cycler. The PD machine is capable of delivering fresh, heated PD fluid to the patient at, for example, 14 kPa (2.0 psig) or higher. The PD machine is capable of removing used PD fluid or effluent from the patient at, for example, between −5 kPa (−0.73 psig) and −15 kPa (−2.2 psig), such as −9 kPa (−1.3 psig) or higher. Fresh PD fluid may be delivered via a dual lumen patient line to the patient and is first heated to body fluid temperature, e.g., 37° C. The heated PD fluid is then pumped through a fresh PD fluid lumen of the dual lumen patient line to a disposable filter set, which is connected to the patient's transfer set, which is in turn connected to an indwelling catheter leading into the patient's peritoneal cavity. The disposable filter set communicates fluidly with the fresh and used PD fluid lumens of the dual lumen patient line. The disposable filter set is provided in one embodiment as a last chance filter for the PD machine, wherein the PD machine may be heat disinfected between treatments.

The system may include one or more PD fluid container or bag that supplies fresh PD fluid to the PD machine or cycler. The PD machine or cycler may include internal lines having two-way or three-way valves and at least one PD fluid pump for pumping fresh PD fluid from the one or more PD fluid container or bag to a patient and for removing used PD fluid from the patient to a house drain or drain container. One or more flexible PD fluid line leads from the PD machine or cylcer's internal lines to the one or more PD fluid container or bag. The flexible dual lumen patient line mentioned above leads from the PD machine or cylcer's internal lines to the patient. A flexible drain line leads from the PD machine or cylcer's internal lines to the house drain or drain container. The system in one embodiment disinfects all internal lines, the PD fluid lines and the dual lumen patient line after treatment for reuse in the next treatment. The disinfection may involve heat disinfection using leftover fresh PD fluid.

To ensure that the filter set is operating properly prior to and during treatment, it is contemplated to perform at least one of a pressure drop test or a pressure integrity test on the hydrophilic membrane of the filter set. In one embodiment, the pressure integrity test is performed prior to treatment, following the priming of the dual lumen patient line and the filter set. It is then contemplated to perform a pressure drop test one or more time during treatment, e.g., at the beginning of each patient fill.

The filter set in one embodiment incudes a short, flexible line extending downstream from a housing of the filter set, wherein the hydrophilic filter membrane resides within the housing, dividing the housing into an upstream chamber (in fluid communication with a fresh PD fluid lumen of the dual lumen patient line) and a downstream chamber (in fluid communication with a used PD fluid lumen of the dual lumen patient line). The upstream chamber is provided with one or more hydrophobic membrane for allowing air aseptically into and out of the upstream chamber as desired. A distal end of the short, flexible line includes a connector that is capped during priming in one embodiment. In another embodiment, the short, flexible line is connected to the patient's transfer set during priming. In either case, air during priming may become trapped in the short, flexible tube. Removing air from the dual lumen patient line and the filter set including the short, flexible tube accordingly involves multiple steps.

In a first step, a control unit of the PD system causes the filter set to be primed by causing the PD fluid pump to pump fresh PD fluid across the hydrophilic filter membrane, pushing air (i) out of the upstream chamber through the at least one hydrophobic membrane and (ii) out of the downstream chamber into the short, flexible line. In a second priming step, the control unit also causes air to be removed air from the short, flexible line by causing the PD fluid pump to apply negative pressure to the used PD fluid lumen, the downstream chamber and the downstream line, pulling (i) fresh PD fluid across the hydrophilic filter membrane to replace the air removed from the short, flexible line and (ii) air into the upstream chamber across the at least one hydrophobic membrane. In a third priming step, the control unit is further configured to remove the air from the upstream chamber by causing the PD fluid pump to pump fresh PD fluid into the upstream chamber, expelling air out of the at least one hydrophobic membrane. After the third priming step, both chambers of the filter set and the short, flexible line are fully primed (may contain a small amount of air).

Once the patient line and the filter set including the short, flexible line are primed, the control unit prior to commencing treatment causes a pressure integrity test to be performed (alternatively, the pressure drop test described herein is performed at the end of prime). In the pressure integrity test, the control unit in one embodiment causes the PD fluid pump to apply negative pressure to the used PD fluid lumen of the dual lumen patient line and the downstream chamber of the filter housing. The negative pressure pulls (i) fresh PD fluid from the upstream chamber across the hydrophilic filter membrane and into the downstream chamber, which in turn causes (ii) air to be pulled into the upstream chamber across the at least one hydrophobic membrane. Because the hydrophilic filter membrane is wet, air cannot travel across the membrane. Thus, as the negative pressure continues to be applied, air fills the upstream chamber of the filter housing.

Once PD fluid is removed from the upstream chamber, such that all or virtually all of the wetted hydrophilic filter membrane is exposed to air on its upstream surface, negative pressure in the downstream chamber is set at a desired integrity test pressure, e.g., from −60 kPa (8.7 psig) to −90 kPa (13.1 psig), such as −75 kPa (10.9 psig). At that point, the control unit closes the valves necessary to lock the negative pressure at the downstream chamber and begins to increment a timer while monitoring the output of one or more pressure sensor positioned and arranged to sense the set negative pressure. The pressure monitoring and timer incrementing occurs for a desired duration sufficient to detect any leak in the hydrophilic filter membrane, e.g., at least one minute, such as 90 seconds.

During the monitoring period, if the measured −75 kPa (10.9 psig) does not "drop" (become less negative) by at or more than an allowable amount, e.g., 2.5 kPa (0.36 psig), then the control unit determines the hydrophilic filter membrane to be intact and allows treatment to proceed, e.g., to an initial patient drain or patient fill. If over that period of time, however, the measured −75 kPa (10.9 psig) does "drop" (become less negative) by at or more than the allowable amount, e.g., 2.5 kPa (0.36 psig), then the control unit determines the hydrophilic filter membrane to be compromised and causes a user interface to provide an audio, video or audiovisual alarm or alert, informing the patient that the filter set is faulty and needs to be replaced.

Although it is possible to perform the pressure integrity test one or more additional time during treatment, the system of the present disclosure may instead perform a pressure drop test on the hydrophilic filter membrane one or more time during treatment, e.g., at the beginning of each patient fill. The pressure drop test is easier to perform and involves the monitoring of multiple pressure sensors, at least one measuring pressure upstream of the hydrophilic filter membrane and at least one measuring pressure downstream of the hydrophilic filter membrane. An intact hydrophilic filter membrane is expected to cause a certain pressure drop, which likely increases over time due to the type of PD fluid being pumped, e.g., higher pressure drops for a last fill PD fluid, e.g., icodextrine or a higher glucose PD fluid. The pressure drop will also increase as the filter membrane accrues fibrin, proteins and other materials on its downstream side from the patient's effluent and bacteria on its upstream side from filtering. It is accordingly contemplated for the control unit to cause the PD fluid pump to flush at least the downstream surface of the filter membrane with fresh PD fluid after each drain to remove solid effluent materials to drain prior to the start of the next patient fill.

For the pressure drop test, multiple upstream and downstream pressure drop readings may be taken and multiple pressure drops may be calculated, e.g., over the period of a few seconds, leading an averaged or mean pressure drop, which is compared to an acceptable pressure drop range or to a minimum expected pressure drop. In an embodiment, if the averaged or mean pressure drop is outside of a range of acceptable pressure drops, or below a minimum acceptable value, the control unit halts treatment and causes the user interface to provide an audio, video or audiovisual alarm or alert, informing the patient that the filter set is faulty and needs to be replaced. If the averaged or mean pressure drop is within a range of acceptable pressure drops, or at or above a minimum acceptable pressure drop, the control unit allows treatment to proceed.

In light of the disclosure set forth herein, and without limiting the disclosure in any way, in a first aspect of the present disclosure, any or all of the structure and/or functionality of any of claims 1 to 21 may be combined with any or all of the structure and/or functionality of any other of claims 1 to 21.

In a second aspect of the present disclosure, which may be combined with any portion or all of the first aspect, any of the features, functionality and alternatives described in connection with any one or more of FIGS. 1 to 15 may be combined with any of the features, functionality and alternatives described in connection with any other of FIGS. 1 to 15.

In light of the above aspects and present disclosure set forth herein, it is an advantage of the present disclosure to provide structure and functionality, which ensures that a hydrophilic filter is intact and ready for use.

It is another advantage of the present disclosure to provide structure and functionality that can test a hydrophilic filter prior to and/or during use.

It is a further advantage of the present disclosure to provide structure and functionality that can test a hydrophilic filter using different tests.

It is yet another advantage of the present disclosure to provide structure and functionality that can test a hydrophilic filter using existing equipment.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the improvements or advantages listed herein, and it is expressly contemplated to claim individual advantageous embodiments separately. In particular, the system of the present disclosure may have any one or more or all of the filter pressure drop test structure and methodology, the patient line including the filter set priming structure and methodology, and the filter pressure integrity test structure and methodology described herein. Moreover, it should be noted that the language used in the specification has been selected principally for readability and instructional purposes, and not to limit the scope of the inventive subject matter.

BRIEF DESCRIPTION OF THE DRAWINGS

FIGS. 3 to 10 illustrate one embodiment for priming the medical fluid, e.g., PD fluid, system for performing or in preparation for performing either one or both of the pressure drop test or the pressure integrity test of the present disclosure.

DETAILED DESCRIPTION

System Overview

Figure 1:
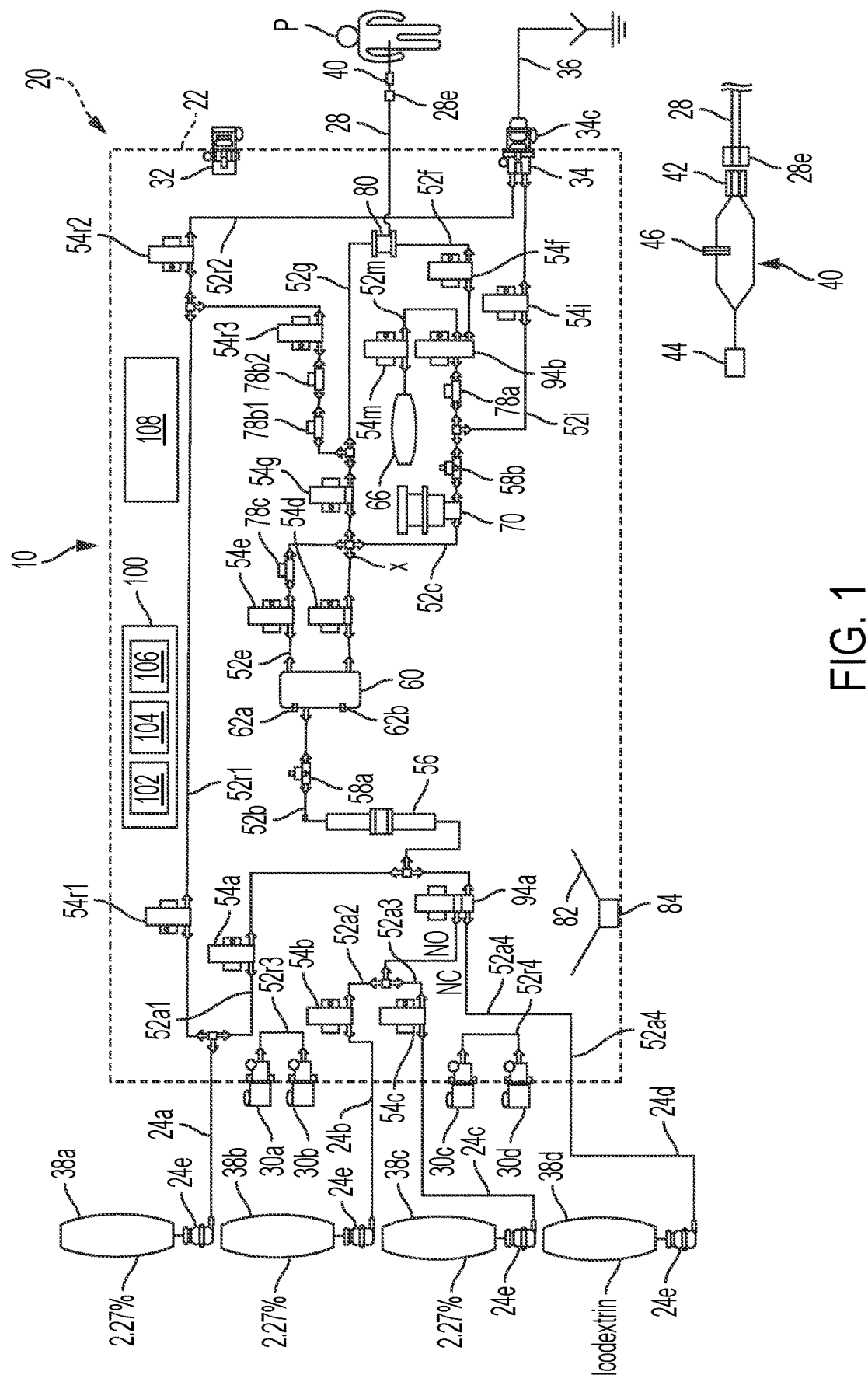
FIG. 1 is a fluid flow schematic of one embodiment for a medical fluid, e.g., PD fluid, system having the filter set testing of the present disclosure, wherein the system is in a treatment state.

Referring now to the drawings and in particular to FIG. 1, a medical system having the enhanced features of the present disclosure is illustrated via peritoneal dialysis ("PD") system 10. System 10 includes a PD machine or cycler 20 and a control unit 100 having one or more processor 102, one or more memory 104, video controller 106 and user interface 108. User interface 108 may alternatively or additionally be a remote user interface, e.g., via a tablet or smartphone. Control unit 100 may also include a transceiver and a wired or wireless connection to a network (not illustrated), e.g., the internet, for sending treatment data to and receiving prescription instructions/changes from a doctor's or clinician's server interfacing with a doctor's or clinician's computer. Control unit 100 in an embodiment controls all electrical fluid flow and heating components of system 10 and receives outputs from all sensors of system 10. System 10 in the illustrated embodiment includes durable and reusable components that contact fresh and used PD fluid, which necessitates that PD machine or cycler 20 be disinfected between treatments, e.g., via heat disinfection.

System 10 in FIG. 1 includes an inline resistive heater 56, reusable supply lines or tubes 52$a$1 to 52$a$4 and 52$b$, air trap 60 operating with respective upper and lower level sensors 62$a$ and 62$b$, air trap valve 54$d$, vent valve 54$e$ located along vent line 52$e$, reusable line or tubing 52$c$, PD fluid pump 70, temperature sensors 58$a$ and 58$b$, pressure sensors 78$a$, 78$b$1, 78$b$2 and 78$c$, reusable patient tubing or lines 52$f$ and 52$g$ having respective valves 54$f$ and 54$g$, dual lumen patient line 28, a hose reel 80 for retracting patient line 28, reusable drain tubing or line 52*i* extending to drain line connector 34 and having a drain line valve 54*i*, and reusable recirculation disinfection tubing or lines 52*r*1 and 52*r*2 operating with respective disinfection valves 54*r*1 and 54*r*2. A third recirculation or disinfection tubing or line 52*r*3 extends between disinfection or PD fluid line connectors 30*a* and 30*b* for use during disinfection. A fourth recirculation or disinfection tubing or line 52*r*4 extends between disinfection connectors 30*c* and 30*d* for use during disinfection.

System 10 also includes PD fluid containers or bags 38*a* to 38*c* (e.g., holding the same or different formulations of PD fluid), which connect to distal ends 24*e* of reusable PD fluid lines 24*a* to 24*c*, respectively. System 10*d* further includes a fourth PD fluid container or bag 38*d* that connects to a distal end 24*e* of reusable PD fluid line 24*d*. Fourth PD fluid container or bag 38*d* may hold the same or different type (e.g., icodextrin) of PD fluid than provided in PD fluid containers or bags 38*a* to 38*c*. Reusable PD fluid lines 24*a* to 24*d* extend in one embodiment through apertures (not illustrated) defined or provided by housing 22 of cycler 20.

System 10 in the illustrated embodiment includes four disinfection or PD fluid line connectors 30*a* to 30*d* for connecting to distal ends 24*e* of reusable PD fluid lines 24*a* to 24*d*, respectively, during disinfection. System 10 also provides a patient line connector 32 that includes an internal lumen, e.g., a U-shaped lumen, which for disinfection directs fresh or used dialysis fluid from one PD fluid lumen of a connected distal end 28*e* of dual lumen patient line 28 into the other PD fluid lumen. Reusable supply tubing or lines 52*a*1 to 52*a*4 communicate with reusable supply lines 24*a* to 24*d*, respectively. Reusable supply tubing or lines 52*a*1 to 52*a*3 operate with valves 54*a* to 54*c*, respectively, to allow PD fluid from a desired PD fluid container or bag 38*a* to 38*c* to be pulled into cycler 20. Three-way valve 94*a* in the illustrated example allows for control unit 100 to select between (i) 2.27% (or other) glucose dialysis fluid from container or bag 38*b* or 38*c* and (ii) icodextrin from container or bag 38*d*. In the illustrated embodiment, icodextrin from container or bag 38*d* is connected to the normally closed port of three-way valve 94*a*.

System 10 is constructed in one embodiment such that drain line 52*i* during a patient fill is fluidly connected downstream from PD fluid pump 70. In this manner, if drain valve 54*i* fails or somehow leaks during the patient fill of patient P, fresh PD fluid is pushed down disposable drain line 36 instead of used PD fluid potentially being pulled into pump 70. Disposable drain line 36 is in one embodiment removed for disinfection, wherein drain line connector 34 is capped via a cap 34*c* to form a closed disinfection loop. PD fluid pump 70 may be an inherently accurate pump, such as a piston pump, or less accurate pump, such as a gear pump that operates in cooperation with a flowmeter (not illustrated) to control fresh and used PD fluid flowrate and volume.

System 10 may further include a leak detection pan 82 located at the bottom of housing 22 of cycler 20 and a corresponding leak detection sensor 84 outputting to control unit 100. In the illustrated example, system 10 is provided with an additional pressure sensor 78*c* located upstream of PD fluid pump 70, which allows for the measurement of the suction pressure of pump 70 to help control unit 100 more accurately determine pump volume. Additional pressure sensor 78*c* in the illustrated embodiment is located along vent line 52*e*, which may be filled with air or a mixture of air and PD fluid, but which should nevertheless be at the same negative pressure as PD fluid located within PD fluid line 52*c*.

System 10 in the example of FIG. 1 includes redundant pressure sensors 78*b*1 and 78*b*2, the output of one of which is used for pump control, as discussed herein, while the output of the other pressure sensor is a safety or watchdog output to make sure the control pressure sensor is reading accurately. Pressure sensors 78*b*1 and 78*b*2 are located along a line including a third recirculation valve 54*r*3. System 10 may further employ one or more cross, marked via an X in FIG. 1, which may (i) reduce the overall amount and volume of the internal, reusable tubing, (ii) reduce the number of valves needed, and (iii) allow the portion of the fluid circuitry shared by both fresh and used PD fluid to be minimized.

System 10 in the example of FIG. 1 further includes a source of acid, such as a citric acid container or bag 66. Citric acid container or bag 66 is in selective fluid communication with second three-way valve 94*b* via a citric acid valve 54*m* located along a citric acid line 52*m*. Citric acid line 52*m* is connected in one embodiment to the normally closed port of second three-way valve 94*b*, so as to provide redundant valves between citric acid container or bag 66 and the PD fluid circuit during treatment. The redundant valves ensure that no citric (or other) acid reaches the treatment fluid lines during treatment. Citric (or other) acid is used instead during disinfection.

Control unit 100 in an embodiment uses feedback from any one or more of pressure sensors 78*a* to 78*c* to enable PD machine 20 to deliver fresh, heated PD fluid to the patient at, for example, 14 kPa (2.0 psig) or higher. The pressure feedback is used to enable PD machine 20 to remove used PD fluid or effluent from the patient at, for example, between −5 kPa (−0.73 psig) and −15 kPa (−2.2 psig), such as −9 kPa (−1.3 psig) or higher (more negative). The pressure feedback may be used in a proportional, integral, derivative ("PID") pressure routine for pumping fresh and used PD fluid at a desired positive or negative pressure.

Inline resistive heater 56 under control of control unit 100 is capable of heating fresh PD fluid to body temperature, e.g., 37° C., for delivery to patient P at a desired flowrate. Control unit 100 in an embodiment uses feedback from temperature sensor 58*a* in a PID temperature routine for pumping fresh PD fluid to patient P at a desired temperature.

FIG. 1 also illustrates that system 10 includes and uses a disposable filter set 40, which communicates fluidly with the fresh and used PD fluid lumens of dual lumen patient line 28. Disposable filter set 40 includes a disposable connector 42 that connects to a distal end 28*e* of reusable patient line 28. Disposable filter set 40 also includes a connector 44 that connects to the patient's transfer set. Disposable filter set 40 also includes a hydrophilic filter membrane 46, which may be of a sterilizing grade, and which further filters fresh PD fluid. Disposable filter set 40 is provided in one embodiment as a last chance filter for PD machine 20, which has been heat disinfected between treatments. Any pathogens that remain after disinfection, albeit unlikely, are filtered from the PD fluid via the hydrophilic filter membrane 46 of disposable filter set 40.

FIG. 1 illustrates system 10 setup for treatment with PD fluid containers or bags 38*a* to 38*d* connected via reusable, flexible PD fluid lines 24*a* to 24*d*, respectively. Dual lumen patient line 28 is connected to patient P via disposable filter set 40. Disposable drain line 36 is connected to drain line connector 34. In FIG. 1, PD machine or cycler 20 of system 10 is configured to perform multiple patient drains, patient fills, patient dwells, and a priming procedure, as part of or in preparation for treatment.

Figure 2:
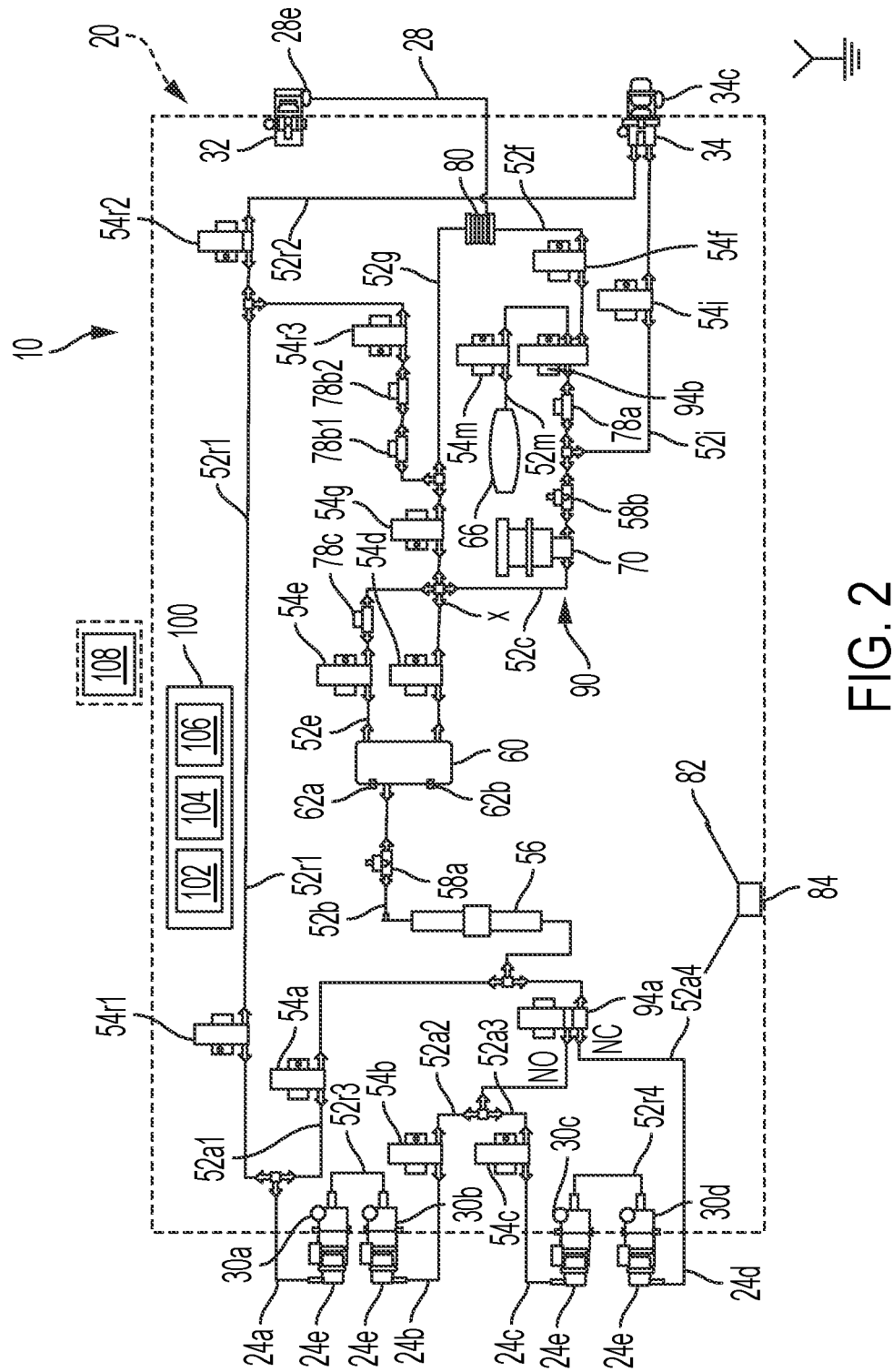
FIG. 2 is a fluid flow schematic of one embodiment for a medical fluid, e.g., PD fluid, system having the filter set testing of the present disclosure, wherein the system is in a disinfection state.

FIG. 2 illustrates system 10 in a disinfection mode. PD fluid containers or bags 38a to 38d are removed and flexible PD fluid lines 24a to 24d are plugged instead in a sealed manner into disinfection or PD fluid line connectors 30a to 30d, respectively. Reusable Dual lumen patient line 28 is disconnected from disposable filter set 40 (which is discarded), and distal end 28e of dual lumen patient line 28 is plugged sealingly into patient line connector 32. Disposable drain line 36 is removed from drain line connector 34 and discarded. Drain line connector 34 is capped via cap 34c to form a closed disinfection loop 90. PD machine or cycler 20 of system 10 in FIG. 2 is configured to perform a disinfection sequence, e.g., a heat disinfection sequence in which fresh PD fluid is heated via inline heater 56 to a disinfection temperature, e.g., 70° C. to 90° C. PD fluid pump 70 circulates the heated PD fluid closed disinfection loop 90 for an amount of time needed to properly disinfect the fluid components and lines of the disinfection loop.

Pressure Drop Test

Referring again to FIG. 1, it is contemplated for control unit 100 to perform a pressure drop test at a desired one or more time before and/or during treatment to ensure that hydrophilic filter membrane 46 of disposable filter set 40 is functioning properly. The pressure drop test requires fluid to be flowing through filter membrane 46. Pressure measurements upstream and downstream of filter membrane 46 are taken while fluid, e.g., PD fluid, flows through filter membrane 46. In FIG. 1, the output from pressure sensor 78a may be used as the upstream pressure measurement, while the output from any one or more of pressure sensor 78b1, 78b2 may be used as the downstream pressure measurement.

It is contemplated to perform the pressure drop test at least during the priming of the internal lines of PD machine or cycler 20, reusable PD fluid lines 24a to 24d, and reusable patient line 28. During priming, patient line 28 is in one embodiment connected to patient P via the connection to disposable filter set 40 and the patient's transfer set, which may be open or closed. Priming may occur instead with a connector at the end of a flexible line or tube 50 (see FIGS. 3 to 7) capped, such that disposable filter set 40 is not yet connected to patient P. In any case, control unit 100 causes fresh PD fluid to be pumped via PD fluid pump 70 from a PD fluid container or bag 38a to 38d, through fresh patient tubing or line 52f, through a fresh PD fluid lumen of dual lumen patient line 28, and through filter set 40 including filter membrane 46. Control unit 100 here causes one of PD fluid valves 54a to 54c or 94a to be open or toggled, valves 54d and 54f to be open, and valve 54g closed. Air is pushed out a hydrophobic vent 48 (see FIGS. 3 to 7) provided in filter set 40 in one embodiment. The fresh PD fluid is heated to patient temperature, e.g., 37° C., during the pressure drop test so that the pressure drop is recorded at treatment conditions.

It should be appreciated that prior to an initial drain, the used PD fluid lumen of dual lumen patient line 28 may be primarily full of air. The air however will be compressed to the PD fluid pressure downstream from filter membrane 46 of filter set 40 as PD fluid is pushed across the filter membrane. Downstream pressure sensors 78b1, 78b2 will accordingly accurately read the pressure downstream from filter membrane 46 even when contacted partially or fully by air.

The pressures for the pressure drop determination, and the determination itself are made over a period of time sufficient to be certain that the determined pressure drop is steady and accurate, e.g., one to five seconds. During this time, multiple sets of upstream and downstream pressure drop readings may be taken and multiple pressure drop calculations may be made. The multiple pressure drop calculations may be averaged, or a mean pressure drop amongst the calculations may be taken as the pressure drop used for comparison to a range of acceptable pressure drops.

In an embodiment, if the averaged or mean pressure drop is outside of a range of acceptable pressure drops, or below a minimum acceptable value, control unit 100 halts treatment and causes user interface 108 to provide an audio, video or audiovisual alarm or alert, informing the patient that filter set 40 is faulty and needs to be replaced. If the averaged or mean pressure drop is within a range of acceptable pressure drops, or at or above a minimum acceptable pressure drop, control unit 100 allows treatment to proceed. In an embodiment, a minimum acceptable pressure drop or pressure drop range at the beginning of treatment is assumed to be that of hydrophilic filter membrane 46 being in a pristine condition.

As mentioned above, the valve at the patient's transfer set may be opened or closed during the pressure drop test performed during priming. Or, filter set 30 may be disconnected from the patient's transfer set during priming. Performing the pressure drop test during priming with the transfer set valve open relieves the patient from the burden of having to remember to open the valve during treatment. But, performing the pressure drop test during priming with the transfer set connected and the transfer set valve open means that PD fluid flow will be split, with some flow returning to PD machine or cycler 20 via the used PD fluid lumen of dual lumen patient line, and some PD fluid flow going to the patient.

Besides priming, it is contemplated to perform a subsequent pressure drop test one or more time during treatment, e.g., at the beginning of each patient fill using PD machine or cycler 20. Here again, pressure measurements upstream and downstream of filter membrane 46 are taken while PD fluid flows through filter membrane 46. In FIG. 1, the output from pressure sensor 78a may again be used as the upstream pressure measurement, while the output from one or more pressure sensor 78b1, 78b2 may again be used as the downstream pressure measurement.

During each patient fill, patient line 28 is connected to patient P via the connection to disposable filter set 40 and the patient's transfer set, which may be open or closed. Control unit 100 causes fresh PD fluid to be pumped via PD fluid pump 70 from one of PD fluid containers or bags 38a to 38d, through fresh patient tubing or line 52f, through a fresh PD fluid lumen of dual lumen patient line 28, through filter set 40 including filter membrane 46, and through the patient's transfer set into the peritoneal cavity of patient P. Control unit 100 here causes one of PD fluid valves 54a to 54c or 94a to be open or toggled, and valves 54d and 54f to be open. Used PD fluid valve 54g is closed. The fresh PD fluid is heated to patient temperature, e.g., 37° C., during the patient fills.

In many instances, after priming, the first treatment operation is to remove a last fill of used PD fluid from patient P. In such a case, the used PD fluid lumen of dual lumen patient line 28 is filled with used PD fluid for each patient fill and each pressure drop test during treatment. If there is no last fill to remove from the patient, such that the first treatment operation is a first patient fill, the used PD fluid lumen of dual lumen patient line 28 may be primarily full of air. Again, however, the air will be compressed to the PD fluid pressure downstream from filter membrane 46 of filter set 40 as PD fluid is pushed across the filter membrane. Downstream pressure sensors 78b1, 78b2 will accordingly accurately read the pressure downstream from filter membrane 46 even when contacted partially or fully by air during the first patient fill.

The pressures for the pressure drop determinations during treatment, and the determinations themselves, may be made over a period of time sufficient to be certain that the determined pressure drop is steady and accurate, e.g., one to five seconds. During this time, multiple sets of upstream and downstream pressure drop readings may be taken by control unit 100 monitoring pressure sensors 78a, 78b1, 78b2 and multiple pressure drop calculations may be made. The multiple pressure drop calculations may be averaged, or a mean pressure drop amongst the calculations may be taken as the pressure drop used for comparison to a range of acceptable pressure drops.

As before with priming, if the averaged or mean pressure drop during treatment is outside of a range of acceptable pressure drops, or below a minimum acceptable value, control unit 100 halts treatment and causes user interface 108 to provide an audio, video or audiovisual alarm or alert, informing the patient that filter set 40 is faulty and needs to be replaced. If the averaged or mean pressure drop is within a range of acceptable pressure drops, or at or above a minimum accept able pressure drop, control unit 100 allows the current patient fill to proceed.

It is contemplated that the pressure drop across hydrophilic filter membrane 46 will increase over the course of treatment. The pressure drop may increase due to the type of PD fluid being pumped, e.g., higher pressure drops for a last fill PD fluid, e.g., icodextrine or a higher glucose PD fluid. The pressure drop will increase as filter membrane 46 accrues fibrin, proteins and other materials on its downstream side from the patient's effluent and bacteria on its upstream side from filtering. It is contemplated for control unit 100 to cause PD fluid pump 70 to flush at least the downstream surface of filter membrane 46 with fresh PD fluid after each drain to remove solid effluent materials to drain prior to the start of the next patient fill. The flush in one embodiment involves pushing a small amount of fresh PD fluid, e.g., five to fifty milliliters, across filter membrane 46 to dislodge solid effluent materials from its downstream surface, and then removing the small amount of PD fluid including the removed effluent materials to drain. Even with the flushes after drains, however, it is contemplated that control unit 100 may have to raise the minimum acceptable pressure drop or pressure drop range over the course of treatment for use in comparing to the measured pressure drops.

Priming/Pressure Integrity Test

Figure 8:
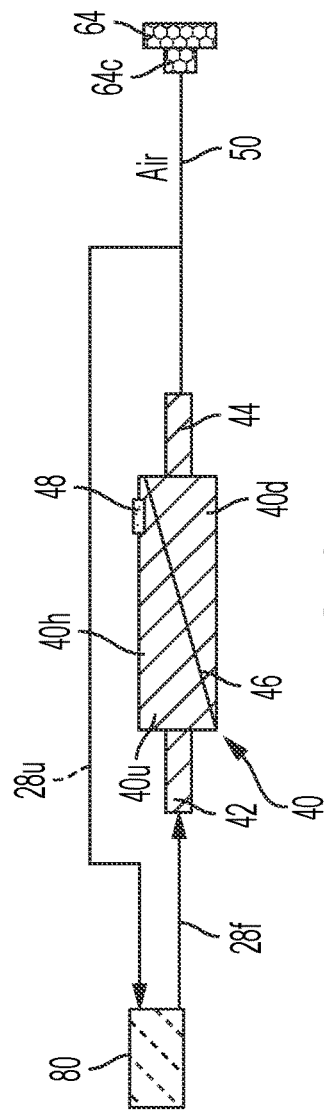

Referring now to FIGS. 3 to 15, just after priming, in addition to or alternative to the pressure drop test, control unit 100 may cause an integrity test for hydrophilic, e.g., sterilizing grade, filter membrane 46 to be performed. FIGS. 3 to 10 illustrate one suitable priming sequence for dual lumen patient line 28 and filter set 40. FIGS. 3 to 10 illustrate that filter set 40 includes a filter housing 40h, which holds hydrophilic filter membrane 46 in a sealed manner so as to form an upstream chamber 40u and a downstream chamber 40d, which are upstream and downstream, respectively, of filter membrane 46. Filter housing 40h includes a connector 42 that connects to a distal end 28e of reusable patient line 28 and a connector 44 that connects to the patient's transfer set, or in one embodiment to a short, flexible line or tube 50, which extends to a connector 64c of a patient's transfer set 64 (FIG. 8).

FIGS. 3 to 10 also illustrate that filter housing 40h includes one or more hydrophobic membrane or vent 48 along the upstream chamber 40u to allow air to be forced or primed out of the filter housing. Filter membrane 46, e.g., sterilizing grade, is made in one embodiment of a hydrophilic material that may have a pore size of about 0.2 micron through which fresh PD fluid flows for further filtration. Filter membrane 46 may be made of, for example, polysulfone or polyethersulfone blended with polyvinylpyrrolidone. The one or more hydrophobic membrane 48 may be made for example from polytetrafluoroethylene ("PTFE").

Figure 3:
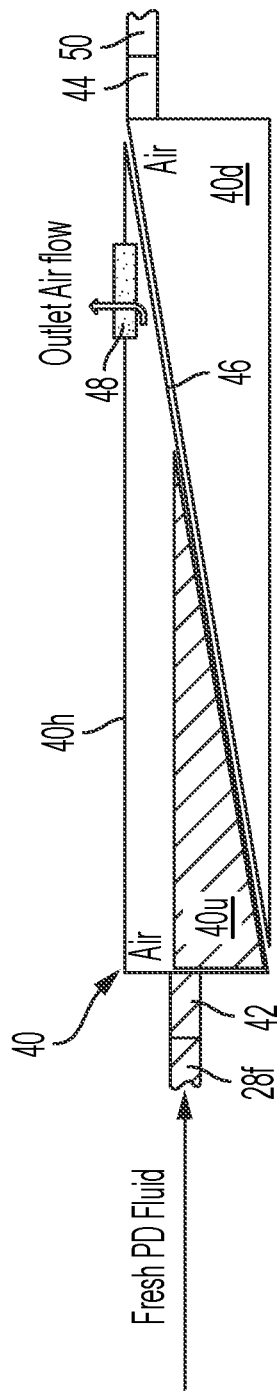
Figure 4:
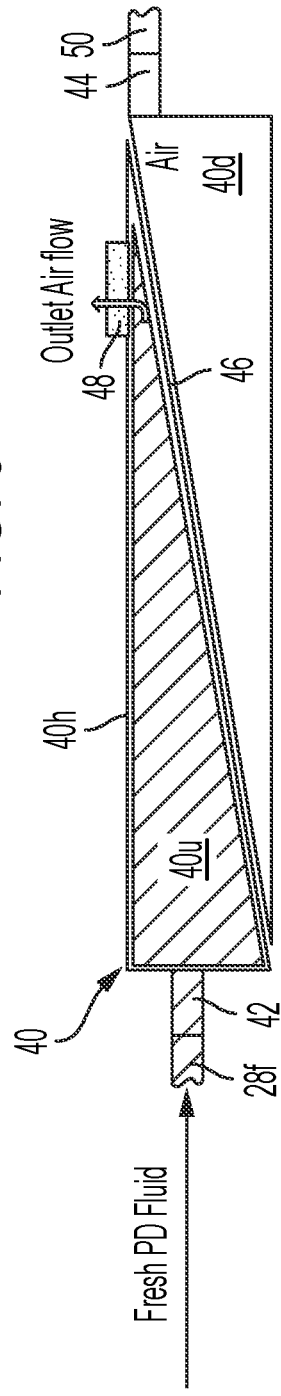

FIG. 3 illustrates a first priming step in which control unit 100 causes the appropriate valves to open and PD fluid pump 70 to pump fresh PD fluid from a PD fluid container or bag 38a to 38d, through the fresh PD fluid lumen of dual lumen patient line 28 into upstream chamber 40u of filter housing 40h so as to contact the upstream side of filter membrane 46. Air in upstream chamber 40u is forced out of the filter housing via one or more hydrophobic membrane or vent 48. Air may also travel through hydrophilic filter membrane 46 as long as it is dry. FIG. 4 illustrates however that filter membrane 46 becomes wetted quickly, forcing the air out through one or more hydrophobic membrane 48 only.

Figure 5:
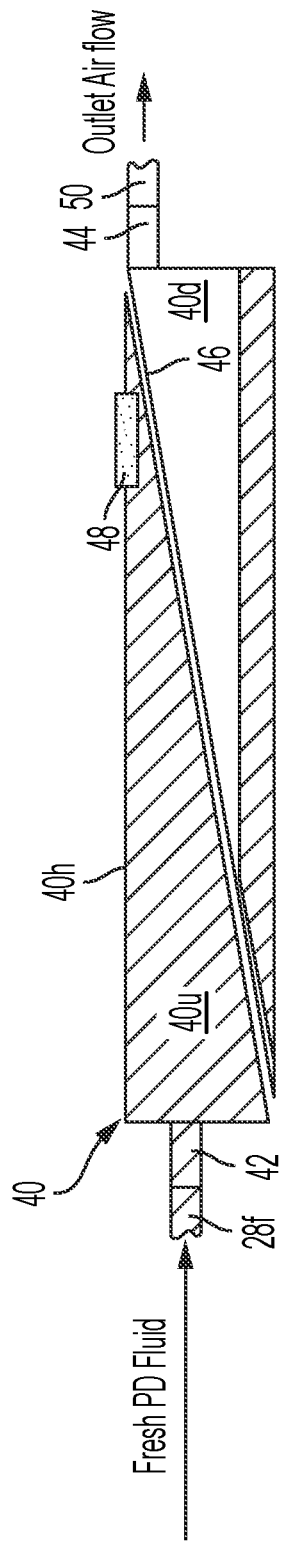

FIGS. 5 to 7 illustrate that once upstream chamber 40u of filter housing 40h becomes completely full of fresh PD fluid, the fresh PD fluid is then forced (filtered) through filter membrane 46 into downstream chamber 40d of filter housing 40h. FIG. 7 illustrates both upstream and downstream chambers completely full of fresh PD fluid.

FIG. 8 illustrates that air from downstream chamber 40d is forced into short, flexible line or tube 50 extending patient transfer set 64. To remove the air pushed into short, flexible line or tube 50, control unit 100 in FIG. 9 causes fresh PD fluid valve 54f to close and used PD fluid valve 54g and drain valve 54i to open. Control unit 100 causes PD fluid pump 70 to apply a negative pressure to used PD fluid lumen 28u of dual lumen patient line 28. The negative pressure pulls both (i) the air in short, flexible line or tube 50 into used PD fluid lumen 28u and (ii) air from ambient into upstream chamber 40u of filter housing 40h through one or more hydrophobic membrane 48. The air entering upstream chamber 40u in turn pushes fresh PD fluid through hydrophilic filter membrane 46 into short, flexible line or tube 50, taking the place of the exiting air. It is accordingly contemplated in one embodiment to configure filter housing 40h and short, flexible line or tube 50, such that the volume of upstream chamber 40u is equal to or greater than the internal volume of short, flexible line or tube 50, so that there is enough fresh PD fluid to fill the flexible tube.

Figure 10:
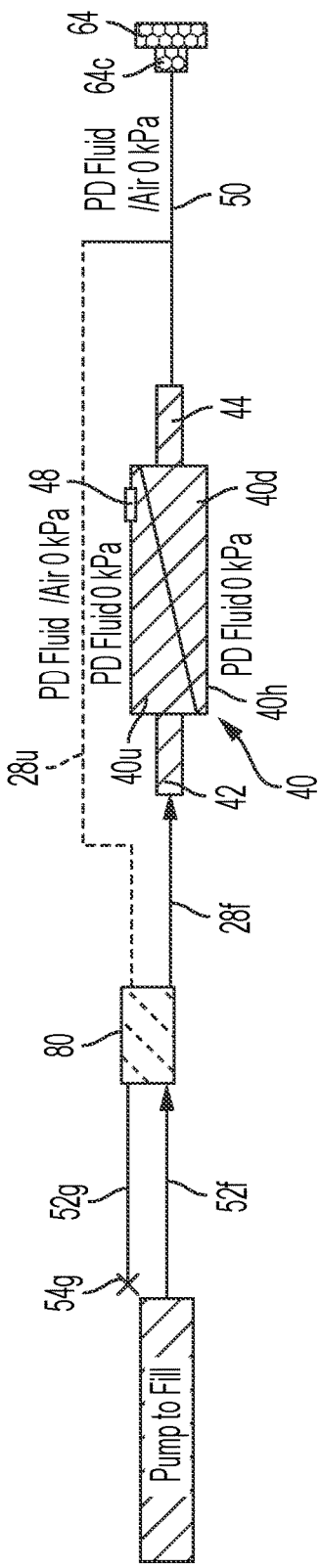

FIG. 10 illustrates that the next step is for control unit 100 to cause used PD fluid valve 54g and drain valve 54i to close and fresh PD fluid valve 54f and the appropriate PD fluid valve to open. Control unit 100 then causes PD fluid pump 70 to refill upstream chamber 40u with fresh PD fluid, purging the air to atmosphere via one or more hydrophobic membrane or vent 48. At the end of the procedure in FIG. 10, filter housing 40h and short, flexible line or tube 50 are both completely full of fresh PD fluid (there may be a small amount of air remaining, e.g., less than one cubic centimeter).

Figure 9:
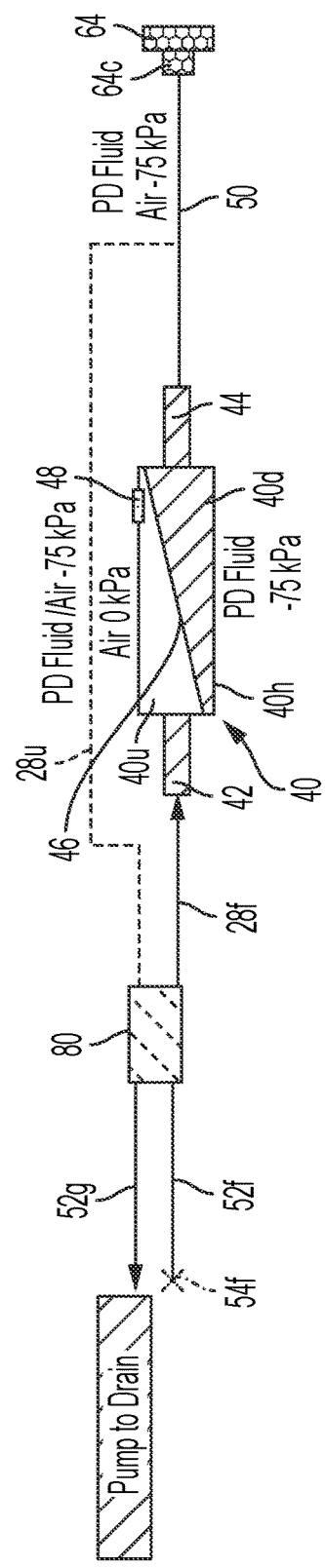

FIGS. 8 to 10 for ease of illustration show used PD fluid lumen 28u of dual lumen patient line 28 extending from short, flexible line or tube 50. It should be appreciated however that used PD fluid lumen 28u may be placed instead in direct fluid communication with downstream chamber 40d of filter housing 40h. As illustrated in FIG. 1, used PD fluid lumen 28u along with fresh PD fluid lumen 28f may both be connected to disposable connector 42, wherein connector 42 includes an internal port that extends into downstream chamber 40*d*, which allows used PD fluid lumen 28*u* to communicate with downstream chamber 40*d*.

FIGS. 11 to 15 illustrate one embodiment for an integrity or pressure hold test of system 10 of the present disclosure, which may occur directly after priming and instead of the pressure drop test discussed above, but wherein the pressure drop test is still performed during treatment, e.g., at the beginning of each patent fill. For the pressure integrity test of FIGS. 11 to 15, with filter housing 40*h* full of PD fluid on both sides of hydrophilic filter membrane 46, the wet membrane becomes a complete wall for air. For the integrity test, control unit 100 causes fresh PD fluid valve 54*f* to close so that fresh PD fluid lumen 28*f* of dual lumen patient line 28 is closed. Control unit 100 also causes used PD fluid valve 54*g* and drain valve 54*i* to open and PD fluid pump 70 to pull a negative pressure on downstream chamber 40*d* via used PD fluid lumen 28*u*, used PD fluid line 52*g*, line 52*c* and drain line 52*i*.

Figure 11:
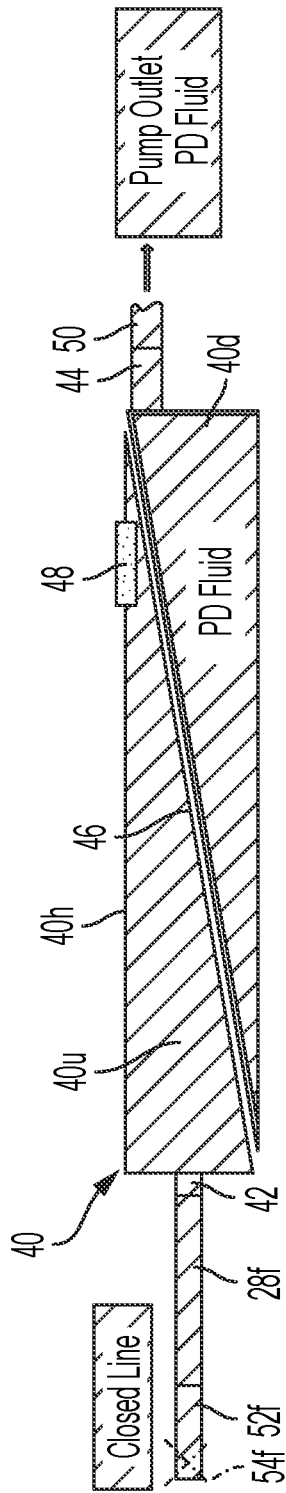
FIGS. 11 to 15 illustrate one embodiment for the pressure integrity test of the present disclosure.
Figure 12:
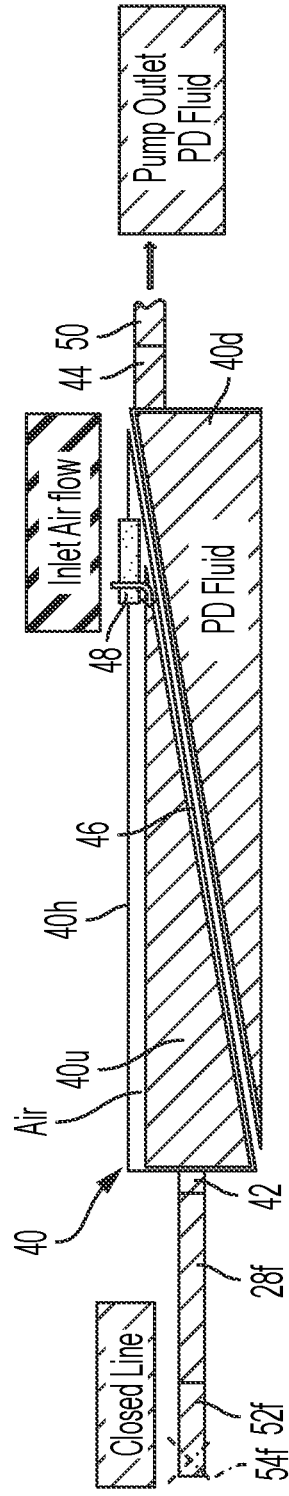
Figure 13:
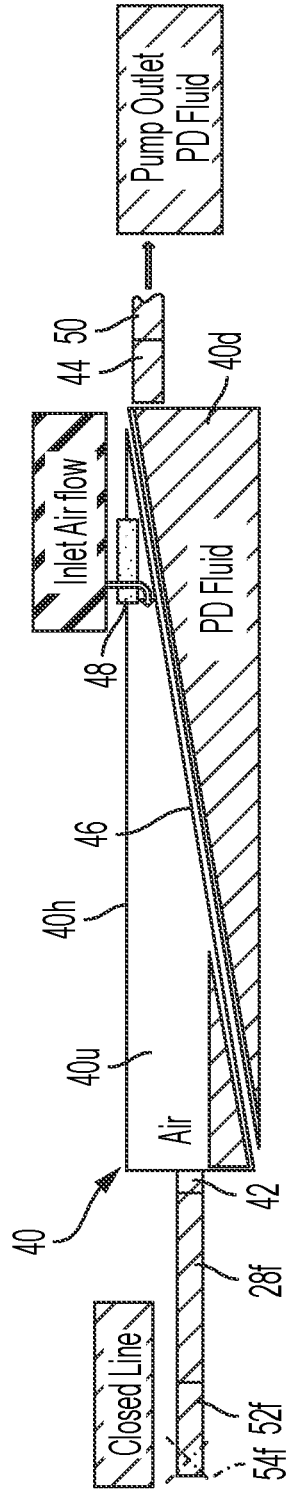

In an embodiment, the integrity or pressure hold test pressure is from −60 kPa (8.7 psig) to −90 kPa (13.1 psig), such as −75 kPa (10.9 psig). FIGS. 11 to 13 illustrate that control unit 100 may operate PD fluid pump 70 at a higher rate initially to more quickly ramp up the negative pressure within downstream chamber 40*d*. FIG. 11 illustrates the initial application of the negative pressure. FIGS. 12 and 13 illustrate that the negative pressure pulls PD fluid across from upstream chamber 40*u*, across hydrophilic filter membrane 46, into downstream chamber 40*d*. Control unit 100 uses the output from at least one pressure sensor 78*b*1, 78*b*2 as feedback to know the negative pressure within downstream chamber 40*d* in one embodiment.

Figure 14:
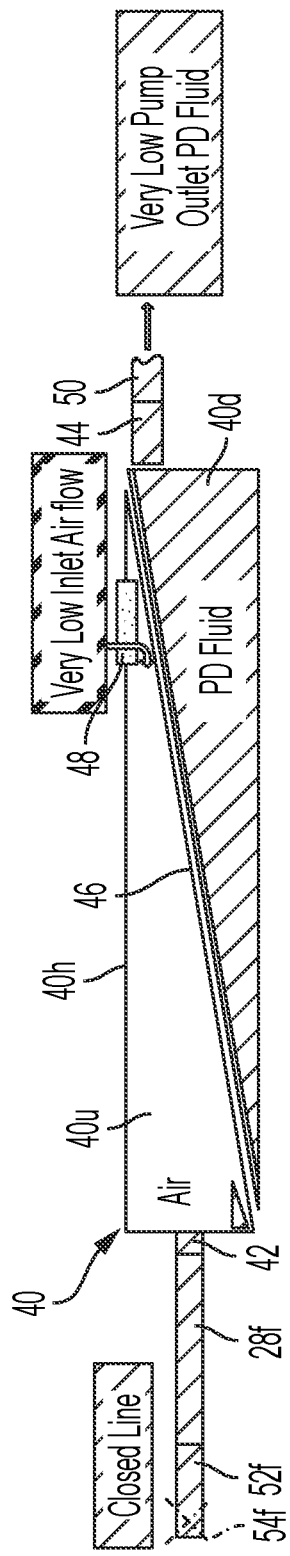

In FIG. 14, when the measured negative pressure approaches the target integrity test pressure, control unit 100 in an embodiment causes PD fluid pump 70 to slow considerably until the negative pressure within downstream chamber 40*d* reaches the target pressure, e.g., −75 kPa (10.9 psig). FIG. 14 also illustrates that almost all PD fluid has been evacuated from upstream chamber 40*u*, across hydrophilic filter membrane 46, into downstream chamber 40*d*.

Figure 15:
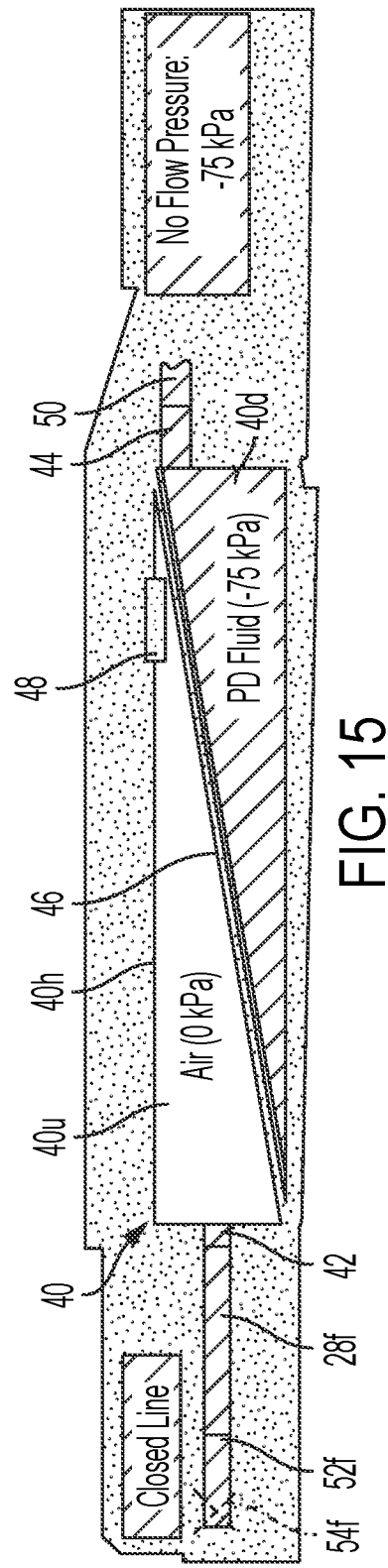

In FIG. 15, once the target pressure is reached, control unit 100 causes PD fluid pump 70 to stop and the integrity or pressure hold test to be performed (with used PD fluid valve 54*g* and drain valve 54*i* open or closed). As illustrated in FIG. 15, upstream chamber 40*u* is at zero kPA (zero psig) due to the access to atmosphere via one or more hydrophobic membrane or vent 48, while downstream chamber 40*d* is maintained at the target pressure, e.g., −60 kPa (8.7 psig) to −90 kPa (13.1 psig), such as −75 kPa (10.9 psig). A relatively large pressure delta exists accordingly across filter membrane 46, which is relied upon to find any leaks in the membrane. In the integrity or pressure hold test of the present disclosure, control unit 100 monitors the output from at least one pressure sensor 78*b*1, 78*b*2 over a specified period of time, e.g., at least a minute or 90 seconds. If over that period of time, the measured −75 kPa (10.9 psig) does not "drop" (become less negative) by at or more than an allowable amount, e.g., 2.5 kPa (0.36 psig), then control unit 100 determines hydrophilic filter membrane 46 to be intact and allows treatment to continue, e.g., to an initial patient drain or patient fill. If over that period of time, however, the measured −75 kPa (10.9 psig) does "drop" (become less negative) by at or more than the allowable amount, e.g., 2.5 kPa (0.36 psig), then control unit 100 determines hydrophilic filter membrane 46 to be compromised and causes user interface 108 to provide an audio, video or audiovisual alarm or alert, informing the patient that filter set 40 is faulty and needs to be replaced.

It is contemplated that the integrity or pressure hold test of system 10 of the present disclosure is able to detect a hole or rupture 10 to 20 μm in nominal diameter. If such a hole or rupture is not found and hydrophilic filter membrane 46 is determined to be intact, control unit 100 repeats the procedure in FIG. 10 in which PD fluid pump 70 is caused to refill upstream chamber 40*u* with fresh PD fluid, purging the air to atmosphere via one or more hydrophobic membrane or vent 48. Filter housing 40*h* and short, flexible line or tube 50 are both full of fresh PD fluid, and hydrophilic filter membrane 46 is ready for treatment.

It should be understood that various changes and modifications to the presently preferred embodiments described herein will be apparent to those skilled in the art. It is therefore intended that such changes and modifications be covered by the appended claims. For example, system 10 for any of the improved treatment features discussed herein does not have to use redundant or durable components, and may instead employ a disposable set having a disposable pumping portion that contacts the corresponding medical fluid. For example, while disposable filter set 40 would not be needed as a last chance filter for a system not having heat disinfection, disposable filter set 40 may still be provided if the fresh PD fluid is made online at the time of use as a last chance filter for the online PD fluid. PD fluid pumping with the disposable set may be performed alternatively via pneumatic pump actuation of a sheet of a disposable cassette of the disposable set, via electromechanical pump actuation of a sheet of a disposable cassette of the disposable set, or via peristaltic pump actuation of a pumping tube segment provided with the disposable set.

The invention is claimed as follows:

1. A peritoneal dialysis ("PD") system comprising:
a housing;
a PD fluid pump housed by the housing;
a filter set including a hydrophilic filter membrane;
a dual lumen patient line in fluid communication with the PD fluid pump, the dual lumen patient line including a fresh PD fluid lumen in fluid communication with an upstream side of the hydrophilic filter membrane and a used PD fluid lumen in fluid communication with a downstream side of the hydrophilic filter membrane;
a first pressure sensor positioned and arranged to provide a first pressure sensor output indicative of a PD fluid pressure in the fresh PD fluid lumen;
a second pressure sensor positioned and arranged to provide a second pressure sensor output indicative of a PD fluid pressure in the used PD fluid lumen; and
a control unit configured to evaluate the hydrophilic filter membrane by analyzing a pressure drop across the hydrophilic filter membrane, wherein the pressure drop includes a difference between the second pressure sensor output and the first pressure sensor output.

2. The PD system according to claim 1, wherein the control unit is configured to evaluate the hydrophilic filter membrane as being intact if the pressure drop is at or above a minimum pressure drop or is within a range of acceptable pressure drops.

3. The PD system according to claim 2, wherein the minimum pressure drop or the range of acceptable pressure drops is raised over a course of treatment.

4. The PD system according to claim 1, wherein the control unit is configured to evaluate the hydrophilic filter membrane as being faulty if the pressure drop is below a minimum pressure drop or is outside of a range of acceptable pressure drops.

5. The PD system according to claim 1, wherein the pressure drop includes an average of a plurality of differences between a plurality of the second pressure sensor outputs and a plurality of the first pressure sensor outputs.

6. The PD system according to claim 1, wherein the pressure drop includes a mean pressure drop derived from a plurality of differences between a plurality of the second pressure sensor outputs and a plurality of the first pressure sensor outputs.

7. The PD system according to claim 1, wherein the control unit is configured to evaluate the hydrophilic filter membrane by analyzing the pressure drop across the hydrophilic filter membrane during at least one patient fill of a PD treatment.

8. The PD system according to claim 1, wherein the control unit is configured to cause the PD fluid pump to flush PD fluid across the hydrophilic filter membrane to a drain after at least one patient drain prior to at least one patient fill.

9. The PD system according to claim 1, wherein the control unit is configured to evaluate the hydrophilic filter membrane by performing a pressure integrity test on the hydrophilic filter membrane prior to a PD treatment.

10. The PD system according to claim 9, wherein the pressure integrity test includes the control unit being programmed to (i) cause the PD fluid pump to create a pressure delta across the hydrophilic filter membrane and (ii) monitor at least one of the first or second pressure sensor outputs to detect a change in the pressure delta.

11. The PD system according to claim 9, wherein the filter set includes at least one hydrophobic membrane, and wherein the control unit is configured to perform the pressure integrity test after priming the filter set, wherein priming the filter set includes expelling air through the at least one hydrophobic membrane.

12. A peritoneal dialysis ("PD") system comprising:
a housing;
a PD fluid pump housed by the housing;
a filter set including a filter housing and a hydrophilic filter membrane dividing an upstream chamber from a downstream chamber within the filter housing;
a dual lumen patient line in fluid communication with the PD fluid pump, the dual lumen patient line including a fresh PD fluid lumen in fluid communication with the upstream chamber and a used PD fluid lumen in fluid communication with the downstream chamber;
a pressure sensor positioned and arranged to provide a pressure sensor output indicative of pressure in the downstream chamber of the filter housing; and
a control unit configured to perform a pressure integrity test on the hydrophilic filter membrane by monitoring the pressure sensor output over a period of time, the pressure sensor output indicative of a negative pressure created in the downstream chamber by the PD fluid pump.

13. The PD system according to claim 12, wherein the negative pressure created in the downstream chamber is a negative PD fluid pressure.

14. The PD system according to claim 12, wherein the negative pressure is −60 kPa (8.7 psig) to −90 kPa (13.1 psig), and the period of time is at least a minute.

15. The PD system according to claim 12, wherein the upstream chamber is maintained at atmospheric pressure during the pressure integrity test.

16. The PD system according to claim 15, wherein the filter housing includes at least one hydrophobic membrane forming a portion of the upstream chamber, and wherein the atmospheric pressure is enabled by the at least one hydrophobic membrane.

17. The PD system according to claim 16, wherein the control unit is configured to create the negative pressure in the downstream chamber by causing the PD fluid pump to apply the negative pressure to the used PD fluid lumen and the downstream chamber, causing PD fluid to be pulled from the upstream chamber into the downstream chamber across the hydrophilic filter membrane, and wherein the PD fluid pulled from the upstream chamber is backfilled via air through the at least one hydrophobic membrane.

18. The PD system according to claim 16, wherein the control unit is configured to cause the filter set including a line extending downstream from the filter set to be primed prior to performing the pressure integrity test.

19. The PD system according to claim 18, wherein the control unit is configured to cause the filter set to be primed by causing the PD fluid pump to pump a fresh PD fluid across the hydrophilic filter membrane, pushing air (i) out of the upstream chamber through the at least one hydrophobic membrane and (ii) out of the downstream chamber into the line extending downstream.

20. The PD system according to claim 19, wherein the control unit is further configured to cause air to be removed from the line extending downstream by causing the PD fluid pump to apply negative pressure to the used PD fluid lumen, the downstream chamber and the line extending downstream, pulling (i) the fresh PD fluid across the hydrophilic filter membrane to replace the air removed from the line extending downstream and (ii) air into the upstream chamber across the at least one hydrophobic membrane.

21. The PD system according to claim 20, wherein the control unit is further configured to cause air to be removed from the upstream chamber by causing the PD fluid pump to pump the fresh PD fluid into the upstream chamber, expelling air out of the at least one hydrophobic membrane.

* * * * *